US005147662A

United States Patent [19]

Nishijima et al.

[11] Patent Number: 5,147,662

[45] Date of Patent: Sep. 15, 1992

[54] TWISTED WIRE MANUFACTURING APPARATUS AND CONCENTRIC TWISTED WIRE MANUFACTURING MACHINE

[75] Inventors: Tamotsu Nishijima; Toshihiro Fujino, both of Numazu, Japan

[73] Assignee: Yazaki Corporation, Tokyo, Japan

[21] Appl. No.: 727,809

[22] Filed: Jul. 8, 1991

Related U.S. Application Data

[62] Division of Ser. No. 519,517, May 4, 1990.

[30] Foreign Application Priority Data

May 8, 1989 [JP] Japan ................................ 1-113687
Aug. 1, 1989 [JP] Japan ................................ 1-198014

[51] Int. Cl.$^5$ ............................................ B29C 53/14

[52] U.S. Cl. .................................. 425/500; 29/33 F; 57/58.52; 57/58.7; 57/311; 72/264; 425/505

[58] Field of Search .............. 425/515, 516, 500, 506, 425/505, 542, 319–322; 57/138, 311, 58.52, 58.7; 72/256, 261, 262, 264, 268; 29/33 F, 872

[56] References Cited

U.S. PATENT DOCUMENTS

| | | | |
|---|---|---|---|
| 1,788,641 | 1/1931 | Sunderland | 57/138 X |
| 2,105,338 | 1/1938 | Sunderland | 57/138 X |
| 2,374,133 | 4/1945 | Ramstedt et al. | 57/138 X |
| 2,411,291 | 11/1946 | Ramstedt | 57/138 |
| 2,724,944 | 11/1955 | Carleton et al. | 57/138 X |
| 3,446,000 | 5/1969 | Smollinger et al. | 57/138 |
| 3,680,604 | 8/1972 | Frohlich et al. | 57/138 X |
| 4,471,527 | 9/1984 | Nishijima | 57/138 X |
| 4,599,853 | 7/1986 | Varga-Papp | 57/138 X |
| 4,870,851 | 10/1989 | Nishijima et al. | 72/261 |

FOREIGN PATENT DOCUMENTS 63-274033 11/1988 Japan .

OTHER PUBLICATIONS

*References were cited in parent case or cited by applicants.

*Primary Examiner*—Richard L. Chiesa
*Attorney, Agent, or Firm*—Armstrong & Kubovcik

[57] ABSTRACT

A twisted wire manufacturing apparatus is provided with cradle which is suspended at a pair of rotating shafts having extreme ends opposed to each other through bearings. A main body of the wire twisting machine is mounted on the cradle. A raw material guide and a twisted wire guide are mounted in respect to a pair of rotating shafts having axial insertion holes. A raw material capstan and the twisted wire take-up machine are mounted on the cradle. The raw wire material is guided through these devices. Another twisted wire manufacturing machine has a plurality of injection dies communicating with an annular groove formed in the rotary head. An annular shoe for gradually reducing a sectional area of the annular groove is slidably fitted to the annular groove. The raw material is supplied into the annular groove and the raw wires are injected from the injection dies. One injection die of a plurality of injection dies is provided with an adjustment for increasing an injection resistance of the raw wires. An injection speed of the core raw wire injected from one injection die is made slower than that of outer layer raw wires injected from other injection dies.

1 Claim, 6 Drawing Sheets

TWISTED WIRE MANUFACTURING APPARATUS AND CONCENTRIC TWISTED WIRE MANUFACTURING MACHINE

This is a division of application Ser. No. 519,517 filed May 4, 1990.

BACKGROUND OF THE INVENTION

1. Field of the Invention

This invention relates to a twisted conductor manufacturing apparatus in which a twisted wire drawing function and a re-twisting function are integrally applied to a main body of an injection type wire twisting machine for feeding wire material, further a smooth feeding of the twisted wire can be attained and a twisting pitch may optionally be set.

This invention relates to a machine for manufacturing a concentric twisted wire to be applied in a transmission line and the like in which both core wire of the concentric twisted wires and outer layer wires can be simultaneously made of the same material by an energy saving facility.

2. Description of the Prior Art

FIG. 2 illustrates a twisted wire manufacturing apparatus of the prior art.

That is, the twisted wire manufacturing apparatus is constructed such that a cradle 36, not driven is suspended to rotating shafts 33 and 35 through bearings in respect to the rotating shaft 33 driven by the motor 32 and the rotating shaft 35 of a supporting block 34, wherein a main body 40 of the twisting machine, driven by a power transmitted from the rotating shaft 33, through a gear reducer 37, a shaft 38 and a gear box 39 is mounted on the cradle 36. Each of arms 41 and 42 is fixed to the rotating shafts 33 and 35 and then a twisted wire guiding rod 43 is arranged at extreme ends of the arms 41 and 42. An upper part of the main body 40 of the wire twisting machine is provided with a hopper 44 for storing raw powder particle material for a twisted wire and then a powder particle supplying pipe 45 is arranged over the hopper 44.

The main body 40 of the wire twisting machine is assembled with an injection molding mechanism as shown in FIG. 3, for example. This mechanism is constructed such that a plurality of injection dies 48 are formed in a concave groove 47 of the rotary body 46, and a movable shoe 49 eccentrically rotating is fitted to the concave groove 47. The raw material drawn in a direction of arrow is gradually fastened as the shoe rotates in respect to a clearance 50 between the concave groove 47 and the movable shoe 49, the raw materials are pushed through the dies 48 as the raw wires 51 and at the same time the wires are twisted by a twisting die 52 shown in FIG. 2 to become a twisted wire 53.

In FIG. 2, the twisted wire 53 passes within the rotating shaft 33 and further passes through a hole 54 opened at the rotating shaft 33 along the arm 41 and guide chips 55 of the twisted wire guiding rod 43, and then the twisted wire is introduced into a hole 56 of the rotating shaft 35 and sent to a final forming take-up machine (not shown). The twisted wire 53 is further twisted between the twisting die 52 and the hole 54 and between the hole 56 and the final forming take-up machine under rotation of the arms 41 and 42.

However, the above-mentioned twisted wire manufacturing apparatus of the prior art had the following disadvantages.

That is, since the raw material supplied from the powder particle supplying pipe 45 to the hopper 44 is repellent and flown by the rotating twisted wire guiding rod 43, a recovery device for the raw material is required. In addition, this apparatus is complicated in construction and made into a large-sized device due to a presence of the supplying device such as the hopper 44 and the like. The twisted wire guiding rod 43 may easily be deformed or the guide chips 55 may be worn out due to pulling action of the twisted wire with the final forming take-up machine.

FIGS. 13*a* and *b* illustrate a concentric twisted wire manufacturing machine disclosed in U.S. Pat. No. 4,471,527 and its FIG. 13*a* is a longitudinal section and FIG. 13*b* is a sectional view taken along a line A—A of FIG. 13*a*.

The concentric twisted wire manufacturing machine 81 is characterized in that an annular groove 83 is arranged at an outer circumference of a rotating head 82 driven by a driving source not shown, an inner projection 87 of a fixed show 86 is slidably fitted to the annular groove 83 so as to have a shape in which a sectional area of the annular groove 83 is gradually decreased, a plurality of injection dies 84 for an outer layer wire communicating with the annular groove 83 are provided and then a core wire feeding hole 85 is formed at a central part of the rotating head 82.

In this figure, reference numeral 88 denotes a raw material guiding roll, the longitudinal raw material not illustrated is supplied into the annular groove 83 from the raw material feeding inlet 89, compressed while being passed within the annular groove 83 and then the material is pushed from a plurality of injection dies 84 as raw material wires for an outer layer (not shown). Then, the raw material wires for the outer layer are twisted and knitted around a central raw material wire (not shown) fed out from the core wire feeding hole 85 by a twisting die so as to form a concentric twisted wire.

FIGS. 14*a* and *b* illustrate a concentric twisted wire manufacturing machine disclosed in Jap. Pat. Laid-Open No. Sho 63-274033, wherein FIG. 14*a* is a longitudinal section and FIG. 14*b* is a sectional view taken along a line B—B of FIG. 14*a*.

The concentric twisted wire manufacturing machine 90 is characterized in that an annular groove 92 is arranged at an outer circumference of an extreme end 91*a* of a rotating head 91 driven by a driving device not shown, a plurality of injection dies 93 communicating with the annular groove 92 are provided, a core wire feeding hole 94 is arranged to pass at a central part of the rotating head 91, a movable annular shoe 95 is eccentrically arranged in respect to the annular groove 92 and an inner projection 96 of the movable shoe 95 is slidably fitted.

In this case, the rotating head 91 is supported in a housing 97 through a bearing 98, and the movable shoe 95 is also eccentrically and rotatably supported in the housing 97 through a bearing 99 in respect to the rotating head 91. A raw material passage 100 formed between the annular groove 92 of the rotating head 91 and the inner projection 96 of the movable shoe 95 has a sectional area which is gradually decreased as the rotating head 91 is rotated, so that a longitudinal raw material (not shown) fed into the raw material passage 100 is gradually compressed and pushed out in sequence through the injection die 93 as a raw material wire for an outer layer near the most compressing point 100*a*. In simultaneous with this operation, the central core wire is supplied from a core wire feeding hole 94 of the rotating head 91, the raw material wires for the outer layer are twisted around the central raw material wire so as to complete a concentric twisted wire.

However, in case of the conventional type of the concentric twisted wire manufacturing machine 81, a core raw wire material had to be prepared separately. That is, since the core raw wire was supplied from the core wire feeding holes 85 and 94 of the rotating heads 82 and 91 in respect to the raw material wire for the formed outer layer and pushed by the injection dies 84 and 93, so that this prior art had a problem that a feeding device (not shown) exclusively applied for the core wire had to be installed and then a cost and a size of the twisted wire manufacturing machine were increased.

SUMMARY OF THE INVENTION

In view of the foregoing disadvantages, it is an object of the invention to provide a twisted wire manufacturing apparatus which is compact in size and does not generate any deformation of a twisted wire guiding rod or wearness of guide chips.

In order to accomplish the above-mentioned object, the invention provides a twisted wire manufacturing apparatus in which a cradle is suspended at a pair of rotating shafts having extreme ends opposed to each other through bearings and a main body of a wire twisting machine is mounted on the cradle characterized in that a raw material guide and a wire twisting guide are mounted in respect to a pair of rotating shafts having axial insertion holes therein, a raw material drawing machine and a twisted wire take-up machine are mounted on the cradle, the raw material is inserted into one of the rotating shafts and sent to the main body of the wire twisting machine from the raw material guide through the raw material drawing machine and then the twisted wire is inserted from the twisted wire guide into the other rotating shaft through the twisted wire take-up machine and guided out of the apparatus.

The raw material is passed from an insertion hole of one rotating shaft through the raw material guide by the raw material drawing machine and then sent to the main body of the wire twisting machine. The twisted wire made by the main body of the wire twisting machine is passed through the insertion hole of the other rotating shaft from the twisted wire guide by the twisted wire take-up machine and sent out of the apparatus. These operations are performed continuously. In this case, the raw material guide and the twisted wire guide are rotated together with the rotating shafts and further it is possible to apply additional twisting to the twisted wires.

In view of the above-mentioned points, the invention aims at, as its object, providing a concentric twisted wire manufacturing machine not requiring any additional core raw wire.

In order to accomplish the above-described object, the present invention provides a twisted wire manufacturing machine in which an annular groove is provided in respect to a rotary head, a plurality of injection dies communicating with the annular groove are arranged, an annular shoe for gradually decreasing a sectional area of the annular groove is slidably fitted to the annular groove, and raw material is supplied into the annular groove, raw wires are pushed through the injection dies so as to be twisted characterized in that one of the plurality of injection dies is provided with means for increasing an injecting resistance for the raw wire, and a pushing speed of the core raw wire pushed from one injection die is slower than a speed of raw wires for an outer layer to be pushed through other injection dies.

Since one of the injection die of a plurality of injection dies is provided with means for increasing an injecting resistance of the raw wire, an injecting speed of the core raw wire is slower than that of each of raw wires for the outer layer and thus it is possible to set a shorter length of the core raw wire than the raw wires for the outer layer requiring some margins of twisting. Accordingly, the core raw wire and the raw wires for the outer layer can be made of the same material simultaneously by an energy saving facility.

BRIEF DESCRIPTION OF THE DRAWINGS

FIG. 13*a* is a longitudinal section and 13*b* is a sectional view taken along a line A—A of FIG. 13*a*.

FIG. 14*a* is a longitudinal section and FIG. 14*b* is a sectional view taken along a line B—B of FIG. 14*a*.

DESCRIPTION OF THE PREFERRED EMBODIMENTS

Figure 1:
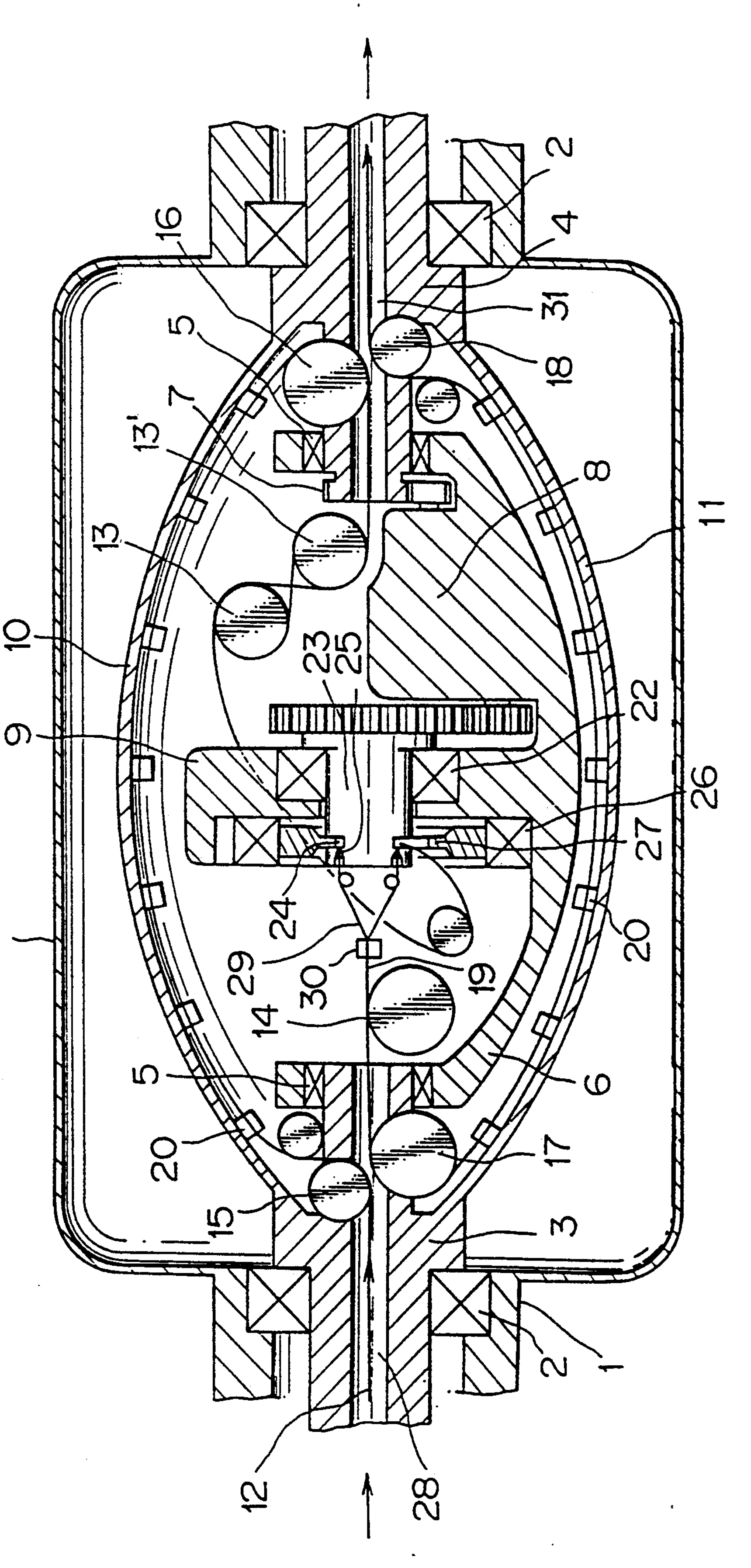
FIG. 1 is a longitudinal section for showing one preferred embodiment of the invention.
Figure 3:
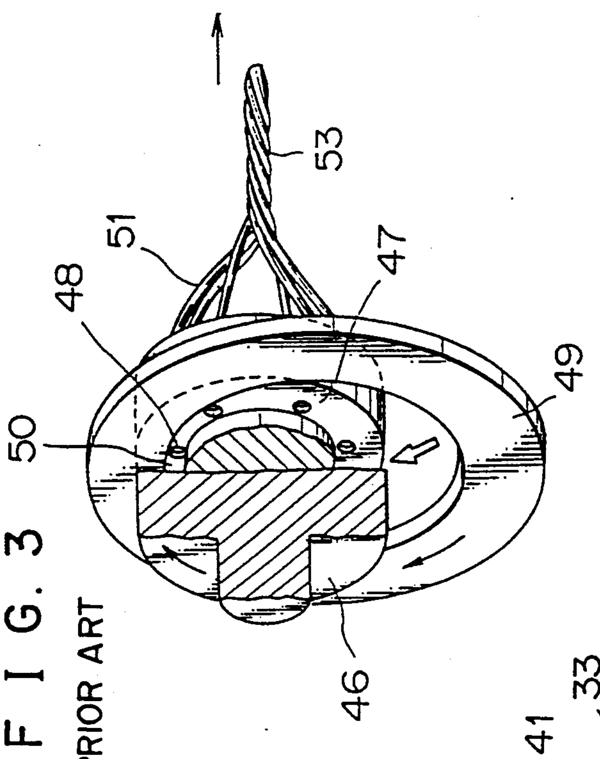
FIG. 3 PRIOR ART
FIG. 3 is a perspective view partly in section for showing a substantial part of a wire twisting machine of FIG. 2.
Figure 2:
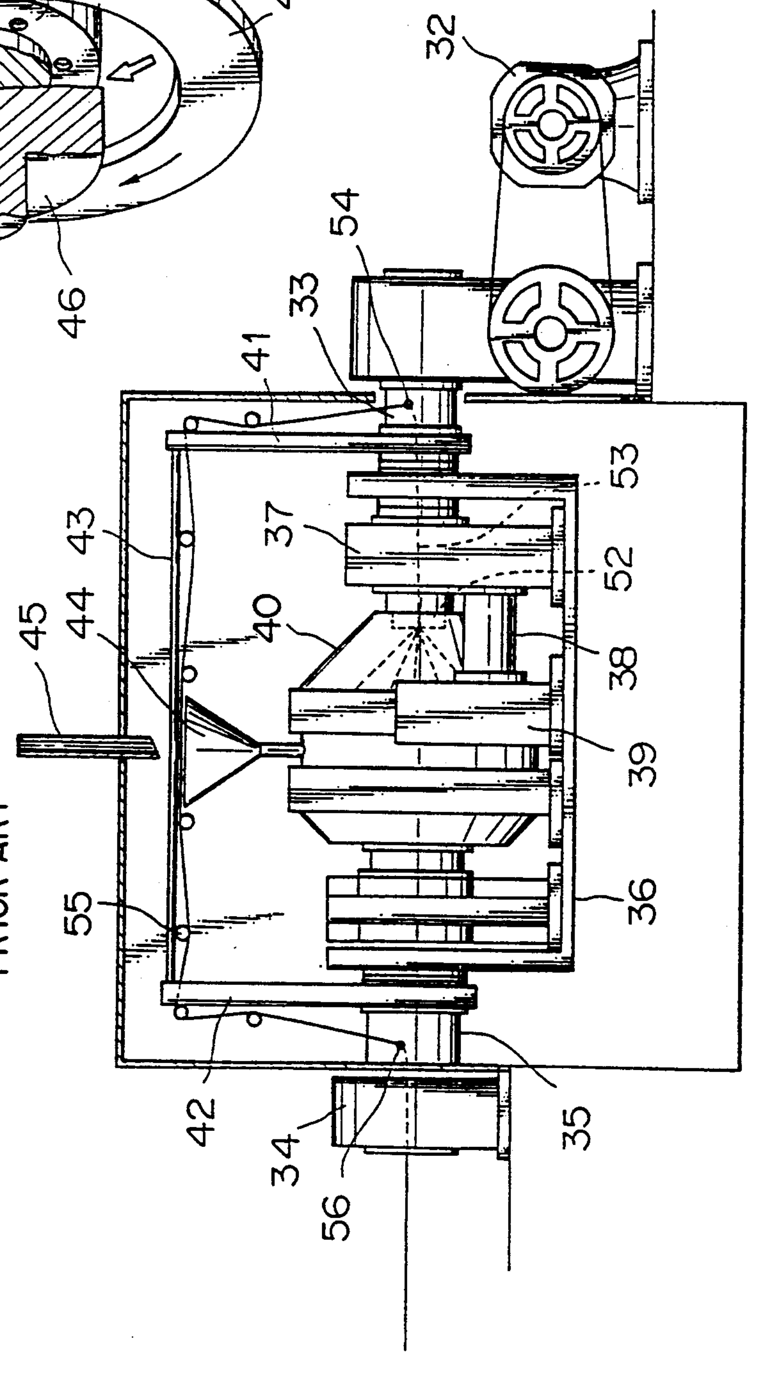
FIG. 2 PRIOR ART
FIG. 2 is a front elevational view for showing a prior art.

FIG. 1 is a longitudinal section for showing one preferred embodiment of a twisted wire manufacturing apparatus of the invention.

That is, the twisted wire manufacturing apparatus is made such that a cradle 6 is suspended at an outer circumference of each of the rotating shafts through bearings 5 in respect to the rotating shafts 3 and 4 rotatably supported in a main body frame 1 of the apparatus through bearings 2 and having a pair of axial right and left through-holes 28 and 31. A gear reducer 8 driven by a gear 7 arranged at an extreme end of the right rotating shaft 4 and a main body frame 9 of the wire twisting machine driven by the gear reducer 8 are mounted in respect to the cradle 6. Bow-like raw material guiding rods 10 and twisted wire guiding rods 11 which connect the rotating shafts 3 and 4 to each other and which can be moved in synchronous with the rotating shafts 3 and 4 within a lower space of the cradle 6 and an upper space of the main body frame 9 of the wire twisting machine are fixed to the rotating shafts 3 and 4. On the cradle 6 are mounted raw material drawing capstans 13 and 13' for drawing a conductive raw wire material 12 and a twisted wire take-up capstan 14.

In this case, the raw material drawing capstans 13 and 13' and the twisted wire take-up capstan 14 are integrally supported by the main body frame 9 of the wire twisting machine and they are driven by the gear reducer 8 through a shaft and a gear box not shown, respectively. In this figure, reference numerals 15 and 16 denote guide rolls integrally supported at an intermediate part between the rotating shafts 3 and 4 and guiding the raw material 12 within each of the through-holes 28 and 31, respectively. Reference numerals 17 and 18 similarly denote guide rolls for use in guiding a twisted wire 19. Reference numeral 20 denotes guide chips properly arranged at the raw material guide rod 10 and the twisted wire guide rod 11. Reference numeral 21 denotes a dust-proof cover.

The main body 9 of the wire twisting machine has an injection molding mechanism which is similar to the prior art. This mechanism is constructed such that a plurality of injection dies 25 are formed within a concave groove 24 of a rotary body 23 supported in a bearing 22, and a movable shoe 27 supported by the bearing 26 and eccentrically rotated is fitted to the concave groove 24.

Then, an operation of the twisted wire manufacturing device will be described.

At first, the raw material 12 fed into the through-hole 28 of the left rotating shaft 3 passes through a guide roll 15 and further passes through the guide chips 20. Its moving direction is reversed by a guide roll 16 at the right rotating shaft 4 and then a deformation of the wire such as a curling of the wire and an adjustment of a tension of the raw material in case of being fed into the main body 9 of the wire twisting machine are carried out by the raw material drawing capstans 13 and 13'. In this case, the raw material drawing capstans 13 and 13' may act to draw the raw material 12 from the outer carrier (not shown) into the main body 9 of the wire twisting machine. The raw material 12 drawn into the clearance between the concave groove 24 of the main body 9 of the wire twisting machine and the movable shoe 27 is gradually compressed as the rotating body 23 is rotated, resulting in that the raw material is pushed from the dies 25 as a raw wire 29, twisted by the twisting die 30 and then it becomes a twisted wire 19. In this case, the twisted wire take-up capstan 14 may apply a tension required for performing a rough forming of the twisted wire 19 and may act to adjust a tension of the twisted wire for a final forming take-up device (not shown). The twisted wire 19 is reversed in its direction by the guide roll 17, passes through the guide chips 20 of the twisted guide rod 11 and further passes through the right guide roll 18, then the wire is sent from the through-hole 31 of the rotating shaft 4 to the final forming take-up apparatus (not shown).

The above-mentioned operation is carried out as the rotating shafts 3 and 4 are rotated. At first a twisting action is applied to the wire before the left guide roll 15 and between the right guide roll 16 and the raw material drawing capstan 13' under an action of the raw material guide rod 10 which is rotated in synchronous with the rotating shafts 3 and 4. The continuous raw material is merely twisted and this wire may not provide any influence against the main body 9 of the wire twisting machine. In addition, a twisting action is applied between the twisted wire take-up capstan 14 and the left guide roll 17 and between the right guide roll 18 and the final forming take-up device (not shown), thereby the number of revolution of the twisted wire guide rod 11 is controlled in addition to the twisting caused by the rotary body 23 of the main body 9 of the wire twisting machine, thus a twisted wire having any twisting pitch can be manufactured.

Figure 4:
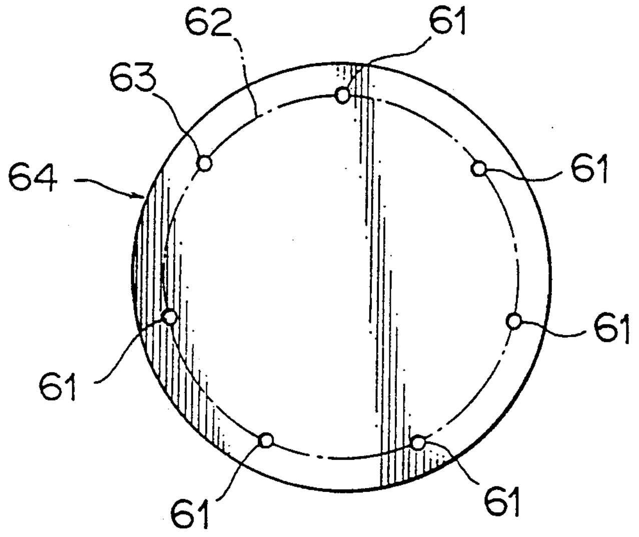
FIG. 4 is a front elevational view for showing a rotary head of the invention.
Figure 13A:
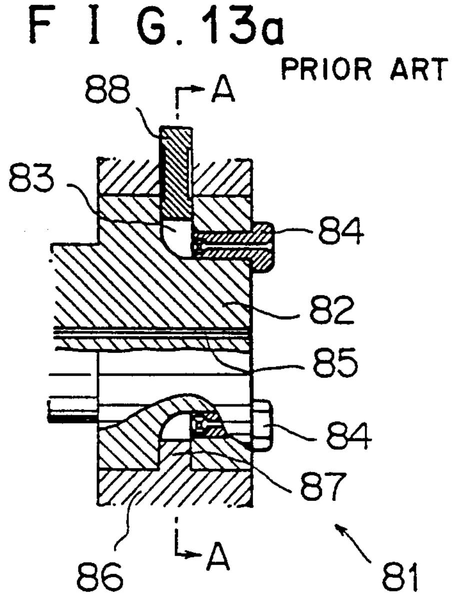
FIG. 13a PRIOR ART
FIGS. 13*a* and *b* illustrate a prior art and its
Figure 13B:
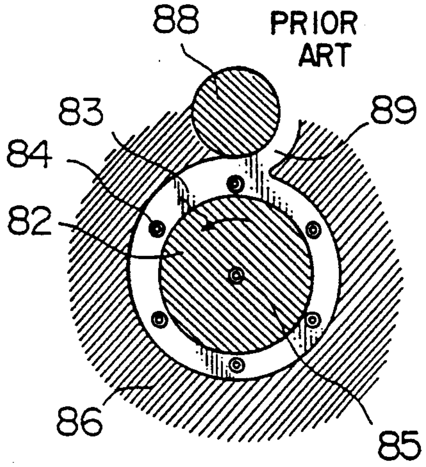
FIG. 13b PRIOR ART
Figure 14A:
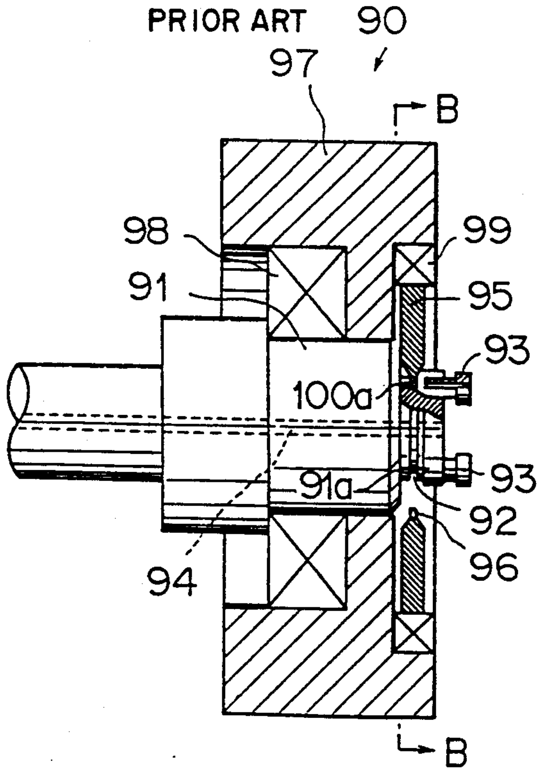
FIG. 14a PRIOR ART
FIGS. 14*a* and *b* illustrate another prior art and its
Figure 14B:
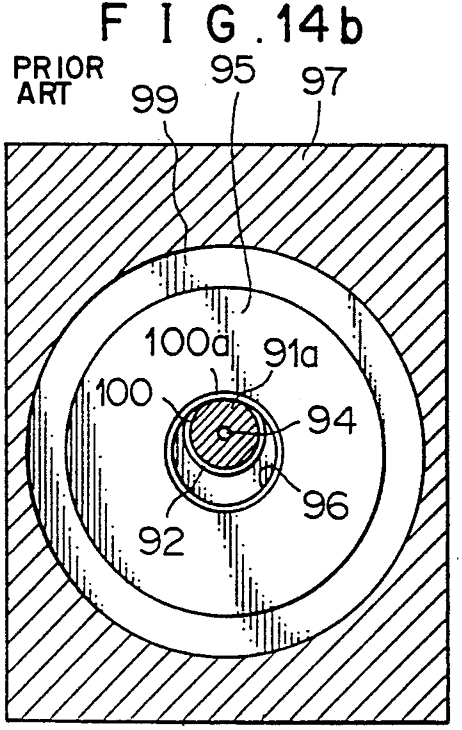
FIG. 14b PRIOR ART

FIG. 4 illustrates a rotating head 64 in the invention in which the core wire feeding holes 85 and 94 are eliminated in respect to the rotating heads 82 and 91 of the concentric wire twisting machines 81 and 90 shown in the prior art (FIGS. 13 and 14) and further a core wire injecting die 63 is arranged on a pitch circle 62 of the injecting die 1 (corresponding to 84 and 93 of FIGS. 13 and 14). In this figure, the rotating head 64 for manufacturing a concentric twisted wire having seven core wires, and one core wire injection die 3 is arranged for six outer layer injecting dies 61.

Figure 5:
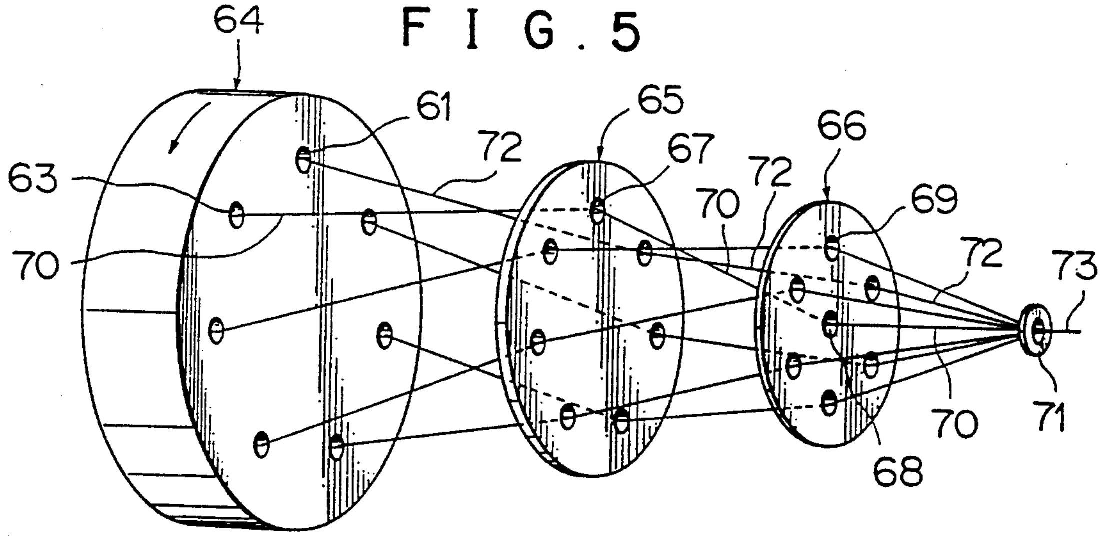
FIG. 5 is a perspective view for showing a substantial part of a concentric twisted wire manufacturing machine of the invention.

FIG. 5 illustrates a substantial part of a concentric wire twisting machine relating to the invention using the rotating head 64 shown in FIG. 4.

In this figure, reference numeral 64 denotes the rotating head, reference numeral 65 denotes a raw wire guide which is rotated in synchronous with the rotating head 64 and further reference numeral 66 denotes a concentric guide which is rotated in synchronous with the rotating head 64. The raw wire guide 65 has seven guide holes 67 equally formed on a circle of the same pitch which correspond to six outer layer wire injection dies 61 of the rotating head 64 and one core wire injection die 63. A pitch circle of the guide holes 67 is set smaller than a pitch circle 62 of the injection die 61 of the rotating head 64. The concentric wire guide 66 is provided with one core wire insertion hole 68 punched in its central part. Six outer layer wire insertion holes 69 are equally arranged around the core wire insertion hole 68 and these insertion holes are arranged in a smaller pitch circle than a pitch circle of the guide holes 67.

Figure 6:
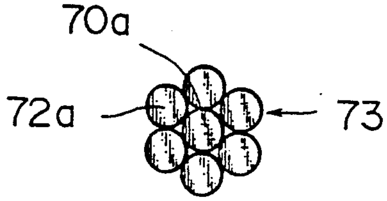
FIG. 6 is a sectional view for showing a concentric twisted wire.
Figure 7A:
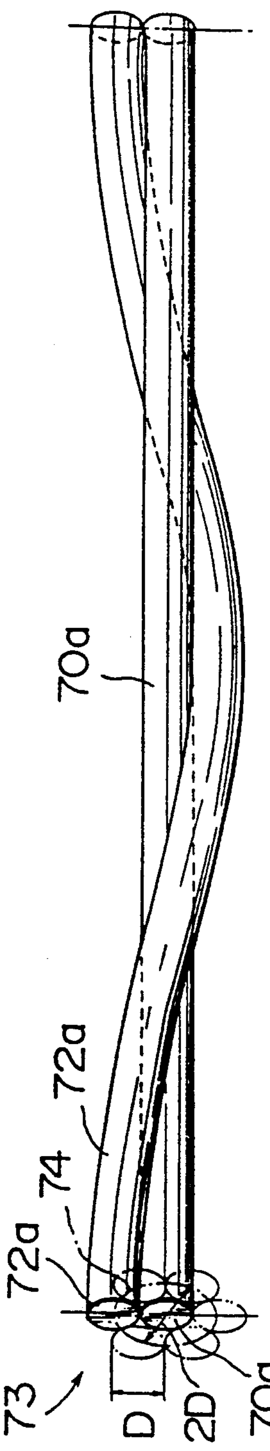
FIGS. 7*a* and *b* are illustrative views for showing a concentric twisted wire.
Figure 7B:
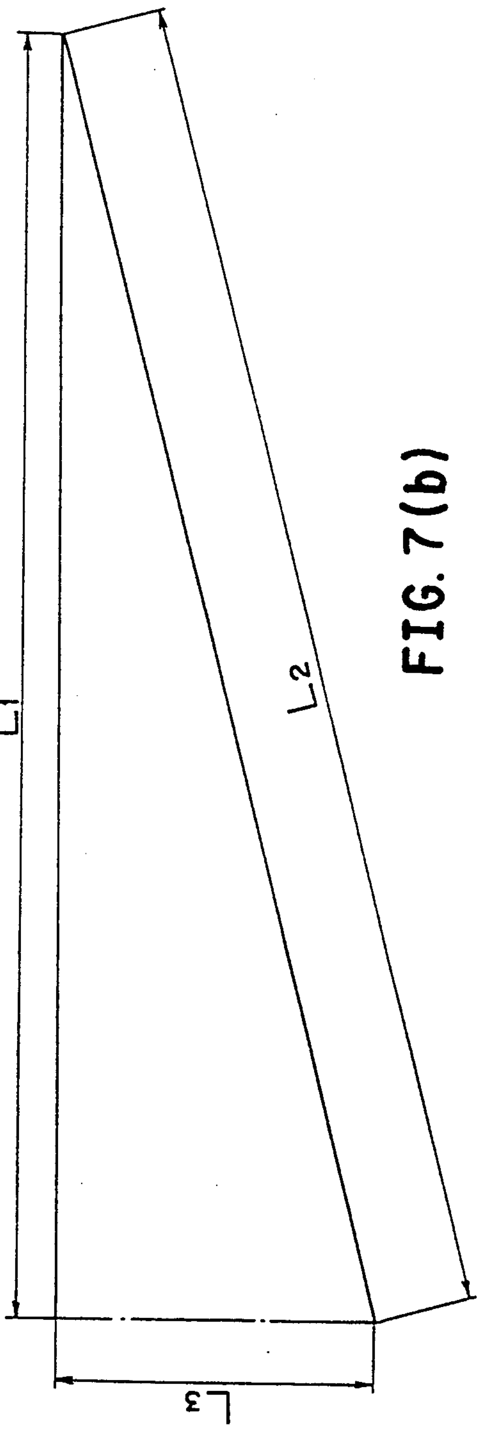

The core raw wires 70 fed out from the core wire injection dies 63 of the rotating head 64 pass through the guide holes 67 of the raw wire guide 65 and through a core wire insertion hole 68 of the concentric wire guide 66 and then they are guided into a twisting die 71. The twisting die 71 amy twist the outer layer raw wires 72 fed out of the concentric wire guide rotated in synchronous with the rotating head 64 with the core wire 70 so as to form the concentric twisted wire 73 as shown in FIG. 6 in their final stage.

In the structure of the concentric wire twisting machine described above, the injecting speed of the core raw wire 70 is set slower than an injecting speed of the outer layer raw wires 72. That is, as shown in FIG. **7*a*, wherein the twisted condition between the core wire 70*a* of the concentric twisted wire 73 and the outer layer wires 72*a* shows that the core wire 70*a* must be set shorter than the outer layer wires 72*a* in order to twist the outer layer wires 72*a* around the core wire 70*a***.

FIG. **7*b* illustrates a size relation of these wires, wherein $L_1$ is a length of one pitch of the core wire 70*a*, $L_2$ is a length of one pitch of the outer layer wires 72*a* and $L_3$ is a length of the pitch circle 74 of the outer layer wires 72*a***. Since $L_1$, $L_2$ and $L_3$ are expressed by a right triangle, if it is assumed that a relation of $$L_2 = \sqrt{L_1^2 + L_3^2}$$

is defined and a diameter of the outer layer wires **72*a* is equal to a diameter of the core wire 70*a* as D, a ratio of $L_1/L_2 \approx 0.977$ and the core wire 70***a* is shorted than the outer layer wires 72*a* by about 2 to 3% since $L_3$ is equal to $2\pi D$ and normally $L_1$ is defined to be equal to 30D.

Accordingly, it is necessary to set the injecting speed of the core raw wire 70 slower than an injecting speed of the outer layer raw wires 72, and so the invention provides means for increasing the injecting resistance of the core raw wire 70 in respect to the core wire injecting dies 63.

Figure 9:
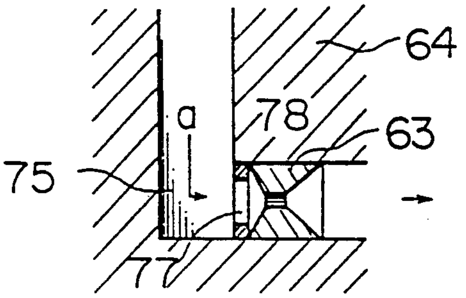
Figure 10:
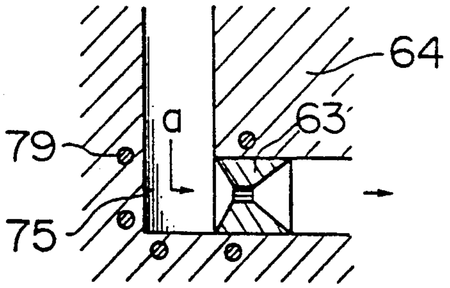
Figure 11:
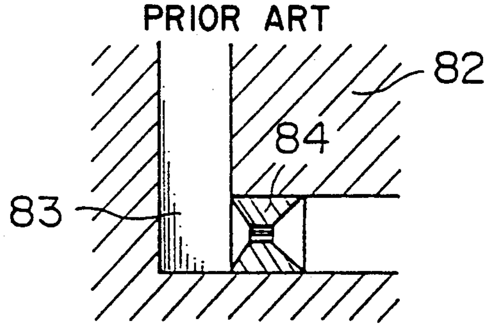
FIG. 11 PRIOR ART
FIG. 11 is a sectional view near an injection die of the prior art.
Figure 12:
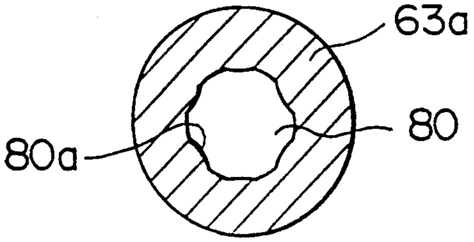

FIGS. 8 to 10 and 12 illustrate a preferred embodiment of this means and FIG. 11 illustrate a structure of the injecting die 84 of the prior art as a purpose of comparison (FIGS. 13*a* and *b*). That is, these figures illustrate a core wire injecting die 63 communicating with the annular groove 75 of the rotating head 64 which is similar to the annular grooves 83 and 92 shown in the prior art (FIG. 11 or FIGS. 14*a* and *b*).

Figure 8:
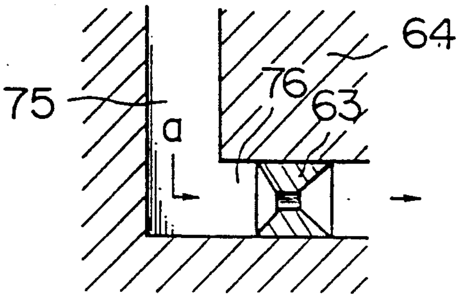
FIGS. 8 to 10 and 12 are sectional views near injection dies for showing an injection speed delay means for a core raw wire in the invention.

FIG. 8 illustrates means in which the core wire injecting die 63 is positioned at an intermediate part of the communicating hole 76 in respect to the annular groove 75 of the rotating head 64, a resistance of the raw material forcedly fed in a direction of arrow (a) is increased within the communicating hole 76 so as to delay an injecting speed of the core raw wire 70.

FIG. 9 illustrates an arrangement in which a spacer 78 having an orifice 77 with a smaller diameter than an inlet diameter of the core wire injecting die 63 is arranged just before the core wire injecting die 63 so as to increase an injecting resistance of the raw material.

FIG. 10 illustrates an arrangement in which a cooling pipe 79 is buried near the core wire injecting die 63 (the rotating head 64), the raw material is cooled, a deformation resistance of the raw material is increased and then the injecting speed is delayed.

In addition, FIG. 12 illustrates an arrangement in which a sectional shape of an inner surface of the orifice 80 of the core wire injecting die 63*a* is made as a non-circular irregular shape 80*a* so as to increase a forming resistance of the core raw wire 70.

As described above, in accordance with the invention, at first the powder particle material is not applied as a raw material, but a wire material is used, so that a recovery device for the powder particle or a supplying device such as a hopper and the like can be eliminated and the apparatus itself can be made compact in size. In addition, the twisted wire drawing machine is installed within the apparatus, so that the twisted wire guide is not deformed and the guide chip is not worn out and at the same time the twisted wire can be smoothly fed, a loss of the power is eliminated and the a smooth production of the twisted wire can be performed. In addition, the feeding material may be of a continuous linear material and not only a single wire but also a twisted wire or a plurality of wires may be applied, resulting in that a degree of freedom of an amount of supplying raw material is increased and then a combination between the twisting action at the main body of the wire twisting machine and an added function of double-twisting enables a twisting pitch of a wider range to be adjusted.

As described above, according to the invention, one of a plurality of injection dies is provided with means for increasing an injection resistance of a raw wire so as to cause an injection speed of the core raw wire injected from one injection die to be slower than a speed of the outer layer raw wires injected from the other injection die, so that it is not necessary to provide a separate core raw wire as found in the prior art and to arrange a core wire feeding device and thus it is possible to reduce a manufacturing cost and make a concentric twisted wire manufacturing machine compact in size.

What is claimed is:

1. A twisted wire manufacturing apparatus in which a cradle is supported by bearings on a pair of axially aligned rotating shafts and a main body of a wire twisting machine is mounted on said cradle, an improvement in which a raw material guide and a twisted wire guide are suspended with respect to said pair of rotating shafts, said shafts each having an axial insertion hole therein, a capstan and a twisted wire take-up machine mounted on said cradle, means for directing raw wire inserted into one of said rotating shafts is guided from said raw material guide to said main body of said wire twisting machine through said capstan, and means for directing twisted wire from said twisted wire guide inserted into the other of said rotating shafts through said twisted wire take-up machine and fed out of said apparatus.

* * * * *